United States Patent
Dhar et al.

(10) Patent No.: US 7,298,753 B1
(45) Date of Patent: Nov. 20, 2007

(54) TECHNIQUE FOR MANAGING HEAVY SIGNALING TRAFFIC THAT IS DIRECTED TO A PARTICULAR SIGNALING CONTROL UNIT

(75) Inventors: Sandeep Dhar, Milpitas, CA (US); Lakshminarayanan Venkataraman, Sunnyvale, CA (US); Shankar Gopalkrishnan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 10/364,048

(22) Filed: Feb. 10, 2003

(51) Int. Cl.
*H04L 12/28* (2006.01)

(52) U.S. Cl. .................... 370/401; 370/395; 370/216; 370/219; 370/220

(58) Field of Classification Search ............... 370/401, 370/395, 216, 219, 220
See application file for complete search history.

(56) References Cited

U.S. PATENT DOCUMENTS

| | | | |
|---|---|---|---|
| 4,800,488 A * | 1/1989 | Agrawal et al. ............ 709/225 |
| 5,313,454 A | 5/1994 | Bustini et al. |
| 5,548,578 A * | 8/1996 | Matsune et al. ............ 370/248 |
| 5,898,691 A | 4/1999 | Liu |
| 6,356,629 B1 | 3/2002 | Fourie et al. |
| 6,427,161 B1 * | 7/2002 | LiVecchi .................... 718/102 |
| 6,615,264 B1 * | 9/2003 | Stoltz et al. ................ 709/227 |
| 6,625,121 B1 | 9/2003 | Lau et al. |
| 6,674,721 B1 | 1/2004 | Ditia et al. |
| 6,725,378 B1 * | 4/2004 | Schuba et al. ................ 726/13 |
| 2002/0064130 A1 * | 5/2002 | Siu et al. .................... 370/235 |
| 2002/0147853 A1 * | 10/2002 | Sherman et al. ............ 709/310 |
| 2003/0182437 A1 * | 9/2003 | Kobayashi et al. ......... 709/232 |
| 2004/0139170 A1 * | 7/2004 | Shen et al. .................. 709/218 |

OTHER PUBLICATIONS

U.S. Appl. No. 09/491,991, filed Jan. 26, 2000.
U.S. Appl. No. 09/753,004, filed Dec. 29, 2000.

* cited by examiner

*Primary Examiner*—Edan Orgad
*Assistant Examiner*—Andrew C. Lee
(74) *Attorney, Agent, or Firm*—Blale;y, Sokoloff, Taylor & Zafman LLP (57) ABSTRACT

A method is described that involves sending a positive imposter response as a consequence of a status request message having been received. The status request message refers to a network connection. The status request message was sent to the networking system to ask the networking system to inquire into the status of the network connection.

51 Claims, 4 Drawing Sheets

TECHNIQUE FOR MANAGING HEAVY SIGNALING TRAFFIC THAT IS DIRECTED TO A PARTICULAR SIGNALING CONTROL UNIT

FIELD OF INVENTION

The field of invention relates generally to networking; and, more specifically to a technique for managing heavy signaling traffic that is directed to a particular signaling control unit.

BACKGROUND

A complex network typically has built into its functionality the ability to maintain and control the connections that it supports. For example, when a user effectively asks to send information to a particular destination (e.g., through the sending of a "connection request" to the network), a network should be able to intelligently inquire as to whether or not sufficient resources exist within the network to transport the information; and, if so, establish the connection so that the information can be transported. Moreover, the network should also be able to monitor the status of the connection (and, on a larger scale, the network itself) so that if an event arises that causes the connection to be interrupted—the network can take appropriate action(s) (e.g., re-route the connection, teardown the connection and ask the user to resend the information, etc.).

The equipment that forms the nodes of the network (e.g., the routers and/or switches that accept customer traffic from various copper and/or fiber optic lines and re-direct the customer traffic onto copper and/or fiber optic lines) are typically constructed with specific functional capabilities that allow these intelligent tasks to be performed. Typically, each network node is designed to have a "signaling control unit" that is responsible for processing connection setup/teardown procedures as well as connection maintenance procedures. Often, although not a strict requirement, the signaling control unit is also responsible for the execution of a routing algorithm that allows its corresponding node to "figure out" (in light of the network's overall topography/configuration (or changes thereto)) where received traffic is to be forwarded.

The signaling control units of the various node are designed to send "signaling" messages to one another so that the network as a whole can successfully perform these connection and network related configuration and maintenance tasks. A problem may arise, however, if a certain type of event (or chain of events) causes a "flood" of these messages to be sent to a particular signaling control unit (e.g., the signaling control unit of a specific node within the network) in a short amount of time. Specifically, if the magnitude of the incoming flood of messages exceeds a signaling control unit's capacity for handling these messages, the signaling control unit is likely to fail in the performance of its connection and/or network management related services.

Figure 1:
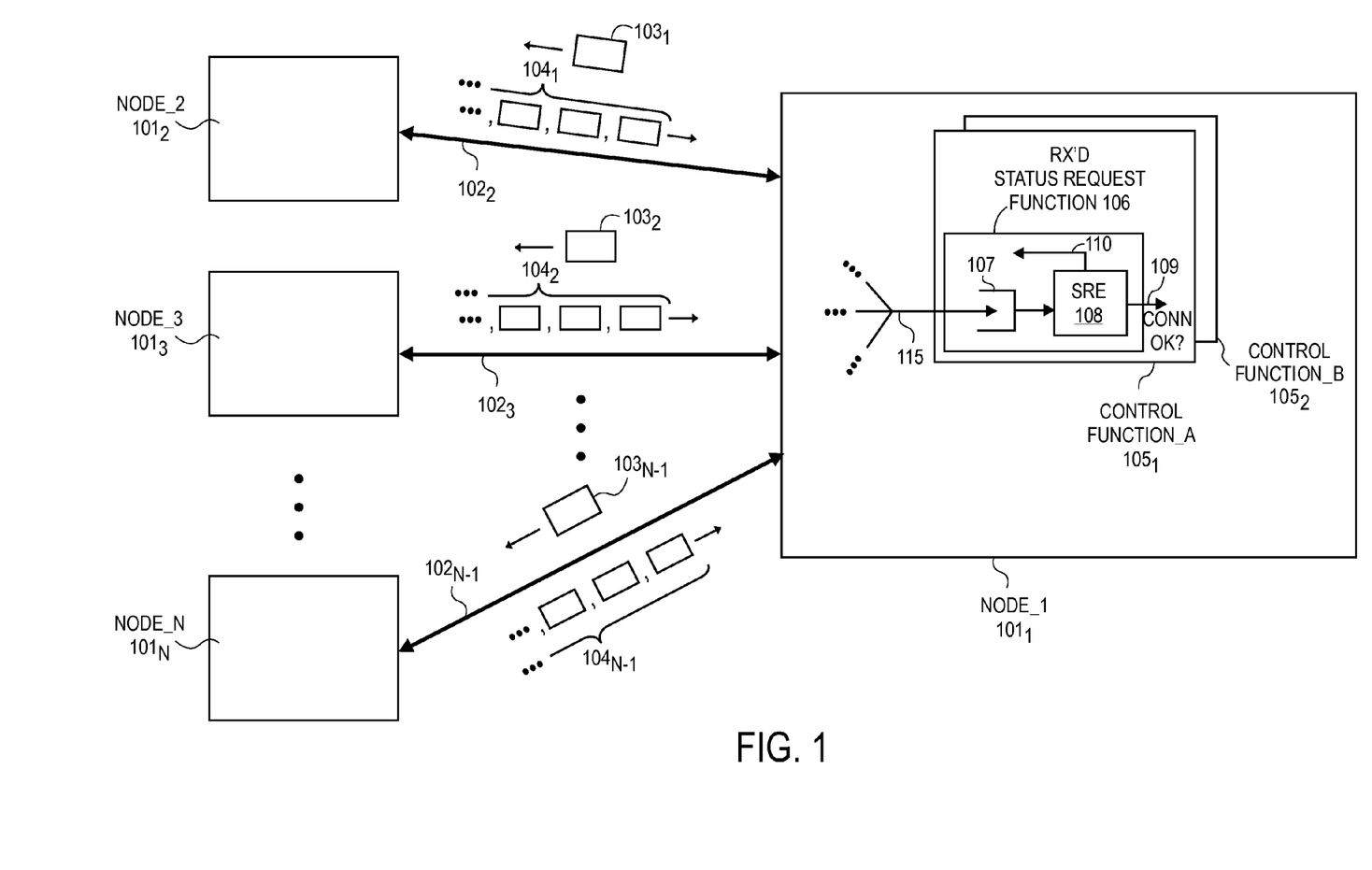
FIG. 1 shows a network node having redundant control functions.

FIG. 1 illustrates one type of event where a "flood" of signaling messages are sent to a particular signaling control unit. According to the example of FIG. 1, network node $101_1$ is communicatively coupled to nodes $101_2$ through $101_N$ through networking lines $102_2$ through $102_{N-1}$, respectively. According to the simple example of FIG. 1, the "primary" signaling control function $105_1$ of node $101_1$ includes, amongst its various tasks and responsibilities, a smaller sub-function that may be referred to as the Received Status Request Function 106. A status request is a type of signaling message that asks (the node to which the message was sent) for a report (for the node that sent the message) as to the status of a particular connection. The status request includes an embedded entry that identifies the particular connection to which the status request pertains.

Under normal operating conditions, the Received Status Request Function 106 is responsible for handling every status request that node $101_1$ is expected to respond to. Note that the Received Status Request Function 106 includes a queue 107 and a status request engine (SRE) 108. As a status request can be sent to node $101_1$ from any of nodes $101_2$ through $101_N$, queue 107 is responsible for gathering and queuing each received status request regardless of its sending source (a feature that FIG. 1 attempts to capture through input flow 115). Whenever the status request engine 108 is able to handle a "next" status request, a "next" status request is removed from the queue 107 and is processed by the status request engine 108.

The processing of a status request as performed by the status request engine 108 entails: 1) inquiring, internally within node $101_1$, into the status of the connection to which the status request referred (a process flow that FIG. 1 attempts to capture through the "Connection OK?" request flow 109); and, 2) once an understanding of the status of the connection at issue is gained, initiating the formation of a signaling message (that is to be sent to the node that sent the status request) that reports the status of the connection from the perspective of node $101_1$ (a process flow that FIG. 1 attempts to capture through response flow 110).

Note that node $101_1$ is implemented with redundant signaling control functions $105_1$ and $105_2$. In a typical implementation, control function $105_1$ is implemented with a first electronic card and control function $105_2$ is implemented with a second electronic card. Under normal operating conditions, one of the control functions (e.g., signaling control function $105_1$) is deemed "primary" and the other control function (e.g., $105_2$) is deemed "inactive" or "on standby". Redundant signaling control functions are used because of the importance of signaling to a working network. Here, if the "primary" control function $105_1$ suffers a significant failure (e.g., if a semiconductor chip used to implement the primary control function $105_1$ stops working), node $101_1$ is designed to automatically "switchover" to control function $105_2$ for the implementation of its signaling control tasks. That is, upon a significant failure by primary control function $105_1$, control function $105_2$ is converted from being a secondary/standby control function to the primary control function of node $101_1$.

Because the switchover to a new primary control function (and/or the failure of the elder control function) may cause temporary disruption to the signaling tasks of node $101_1$, node $101_1$ broadcasts to its neighboring nodes $101_2$ through $101_N$ that it has undergone a "switchover" to a new primary control function. The broadcast is illustrated in FIG. 1 by the sending of N−1 signaling messages $103_1$ through $103_{N-1}$ to each of nodes $101_2$ through $101_N$, respectively. According to various signaling control implementations, the receipt of a signaling message that indicates a node has undergone a control function switchover causes a recipient of such a signaling message to send a status inquiry, to the node that underwent a control function switchover, for each connection that is carried by both the recipient of the signaling message and the sender of the signaling message.

According to the example of FIG. 1, this causes a "flood" of status request messages (represented collectively by status request message trains $104_1$ through $104_{N-1}$) to be sent to node $101_1$, as a status request message for each connection carried by node $101_1$ and nodes $101_2$ through $101_N$ collectively is sent from nodes $101_2$ through $101_N$ collectively to node $101_1$. As a consequence, in many instances, the queue of control function $105_2$ that is equivalent to queue 107 of control function $105_1$ (not shown in FIG. 1) is not designed with a depth that is sufficient to queue all of the incoming status request messages; and/or, the status request engine of control function $105_2$ does not have the processing power to process the flood of status request messages within a reasonable amount of time.

According to various signaling control function implementations, if a response to a status inquiry is not received within a specific amount of time, the sending node of the status inquiry message is designed to teardown the connection on the assumption that the connection has already been dropped (on the assumption that the node that failed to respond to the status inquiry message is no longer supporting the connection). In the example of FIG. 1, the failure of control function $105_2$ to adequately handle the flood of incoming status inquiries should cause nodes $101_2$ through $101_N$ to begin to drop those connections whose corresponding status request messages were not responded to or were not responded to on time. Note that, in such a situation, these connections are apt to be dropped inadvertently. That is, the connections themselves are fully operational (i.e., were not catastrophically affected by the switchover event) and therefore should not be dropped; and, it is merely the shortcoming in the capacity of the Received Status Request Function of control function $105_2$ to handle the flood of status requests that has caused these properly functioning connections to be dropped.

FIGURES

The present invention is illustrated by way of example and not limitation in the figures of the accompanying drawings, in which like references indicate similar elements, and in which.

DETAILED DESCRIPTION

Figure 2:
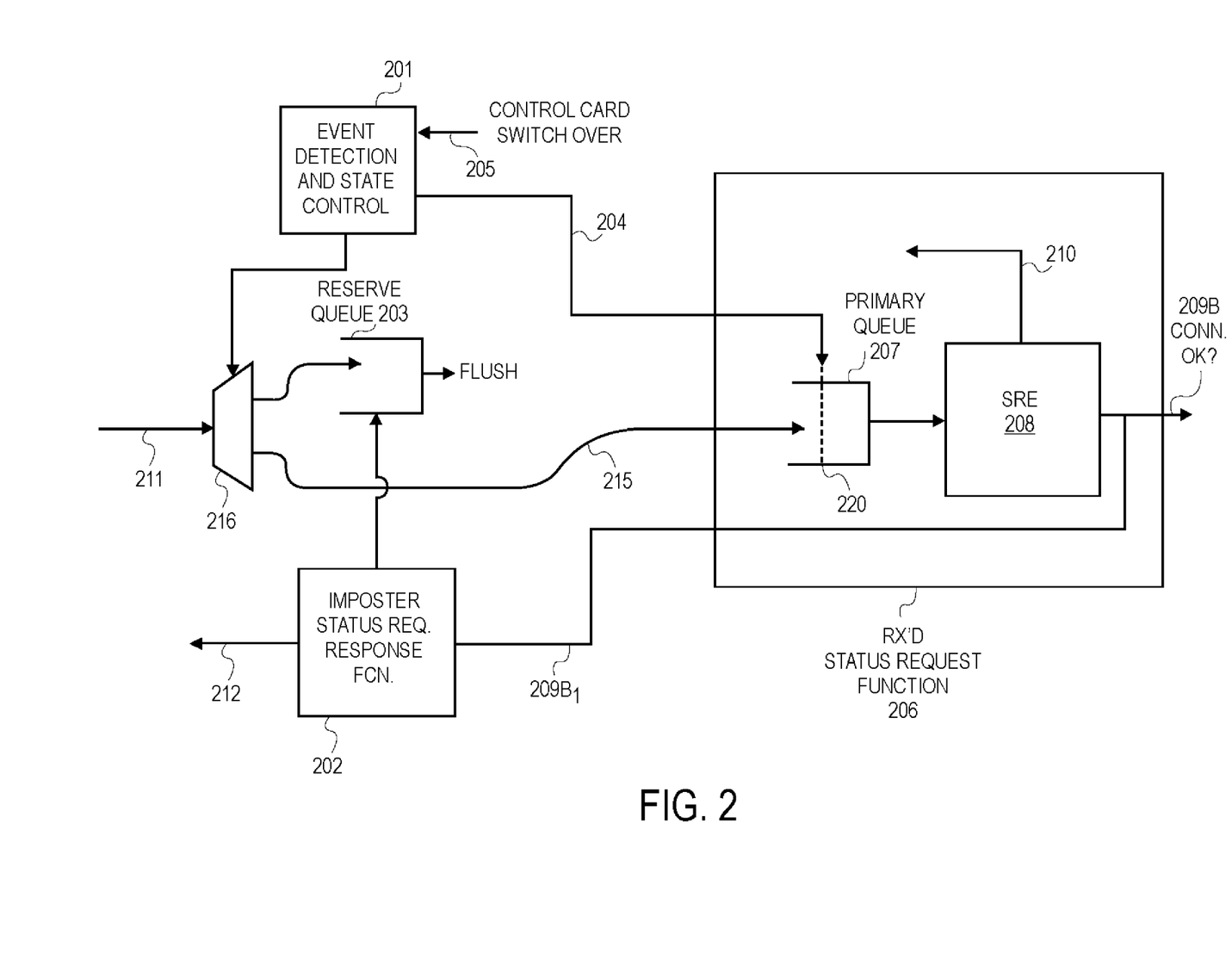
FIG. 2 shows a functional architecture that allows a node that receives a flood of signaling messages to handle the flood of signaling messages.

FIG. 2 shows a functional architecture that prevents a flood of incoming status request messages from reaching the primary queue 207 that services the service request engine (SRE) 208. As a consequence, the Received Status Request Function 206 is saved from being overloaded in the face of a sudden flood of service request messages. The functional architecture of FIG. 2 can be viewed as having two states: 1) normal; and, 2) active offload. In the normal state, the current number of received service request messages yet to be responded to is deemed to be within the processing capacity of the Received Status Request Function 206; and, as such, the Received Status Request Function 206 is not provided with any active help. In the active offload state, the current number of received or anticipated service request messages yet to be responded to is deemed to be beyond the processing capacity of the Received Status Request Function 206; and, as such, the Received Status Request Function 206 is provided with active help.

Figure 3A:
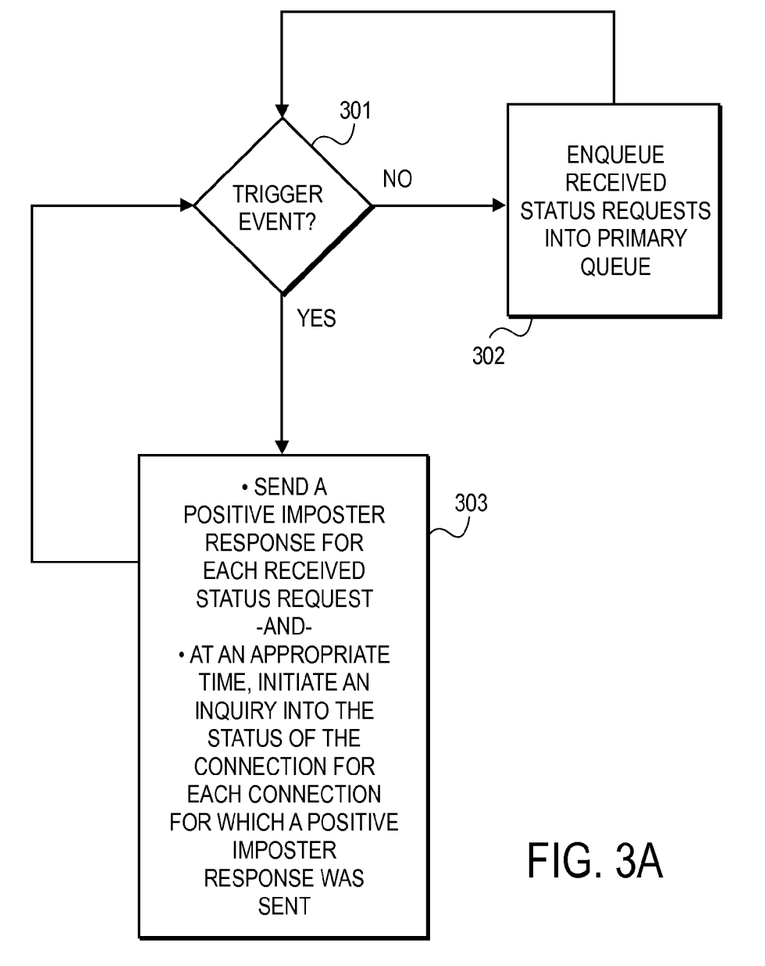
FIG. 3a shows a methodology that can be executed by the functional architecture of FIG. 2.

FIG. 3a shows a methodology that helps describe the functional tasks that are performed in either of the two states. More precisely, sequence 302 describes the processing that is entertained during the normal state; and, sequence 303 describes the processing that is entertained during the active offload state. Whether the processing of service request messages is to be entertained in the normal state or the active offload state depends upon whether or not a specific, looked for "trigger" event has arisen 301. If a trigger event that is worthy of helping the Received Status Request Function 206 is deemed to have arisen 301; then, the active offload state is entered and sequence 303 is executed. If such a trigger event is deemed to have not arisen; then, sequence 302 is executed within the normal state.

Referring to FIGS. 2 and 3a, execution within the normal state simply means that received status request messages are queued 302 into the primary queue 207 of the Received Status Request Function 206. As a consequence, whenever the status request engine 208 is able to handle a "next" status request, a "next" status request is removed from the queue 207 and is processed by the status request engine 208. In an embodiment, the processing of a status request (as performed by the status request engine 208) entails: 1) inquiring into, within the node where the Received Status Request Function 206 resides, the status of the connection to which the status request referred (a process flow that FIG. 2 attempts to capture through the "Connection OK?" request flow 209b); and, 2) once an understanding of the status of the connection at issue is gained, initiating the formation of a signaling message (that is to be sent to the node that sent the status request) that reports the status of the connection from the perspective of the node where the Received Status Request Function 206 resides (a process flow that FIG. 2 attempts to capture through response flow 210).

As such, the operation of the Received Status Request Engine 206 is largely the same as that described in the Background. Note that, if FIG. 2 is viewed as a hardware implementation, during the normal state, received status request messages that are received at input 211 are directed by multiplexer 216 along input 215 to the primary queue 207. Here, the event detection and state control function 201 is responsible for controlling the channel select of multiplexer 216 (so that, during the normal state, received status request messages that are presented at input 211 are directed to primary queue 207 rather than reserve queue 203). As can be distilled from its name, the event detection and state control function 201 is capable of detecting a trigger event that is sufficient to cause entry from the normal state into the active offload state (e.g., the event detection and state control function 201 is able to detect or predict a flooding of status request messages); and, likewise, is also capable of causing entry from the active offload state into the normal state (e.g., in light of a prior flood of status request messages being suitably abated).

Upon detection of a trigger event worthy of entry into the active offload state, a positive imposter response is sent for each subsequently received status request message 303 while in the active offload state. Here, a positive imposter response is a formal response to a received status request message that: 1) indicates that the connection to which the received status request message was directed is properly working; and, 2) was not verified for correctness (i.e., no inquiry was actually made into the true status of the connection to which the received status request message was directed). The former quality corresponds to the response being "positive"; the later quality corresponds to the response being an "imposter". Thus, in an embodiment, a positive imposter response corresponds to a signaling message that is sent back to the node that originally sent the received status request message and that indicates that the connection at issue is working properly, where, in fact, the true status of the connection at issue was not actually looked into.

The sending of a positive imposter response for each status request message that is received during the active offload state should have the opposite effect from that described in the Background. That is, whereas, under prior art implementations, a flooding of status request messages tends to result in a large number of properly working connections being inadvertently dropped (as described in the Background), the automatic sending of positive imposter responses for each of the status request messages received under flooded circumstances should result in a large number of properly working connections being maintained rather than inadvertently dropped. Here, recalling that the original sending node of a status request message is configured to automatically tear down a connection if a positive response is not timely received—the automatic sending of a positive imposter response should effectively prevent a properly working connection from being torn down (because the automatic sending of the response should cause the response to be timely received; and, because the response indicates that the connection at issue is working properly).

Referring to FIG. 2, the event detection and state control function 201, upon recognition that a trigger condition for entering the active offload state has been reached (e.g., through detection of signaling control function card "switchover" at input 205), changes the channel select input to multiplexer 216 so that received status request messages are entered into the reserve queue 203. For each status request message that is entered into the reserve queue 203, the imposter status request response function 202 identifies the address of the node that sent the status request message and the connection to which the status request message was directed. As a consequence of gaining this information the imposter response function 202 performs a pair of acts for each message that is queued into the reserve queue 203.

Firstly, as discussed above, for each status request message that was queued into the reserve queue 203, the imposter status request response function 202 initiates the sending of a positive imposter response (noting that a response is sent to the address of the node that originated a request and also references the connection that the request was directed to). Secondly, at an appropriate later time, the imposter status request function 202 initiates an inquiry into the true status of each connection that a positive imposter response was sent on behalf of 303. Here, process flow 212 is drawn to indicate the former act and process flow 209$b_1$ is drawn to indicate the later act.

Figure 3B:
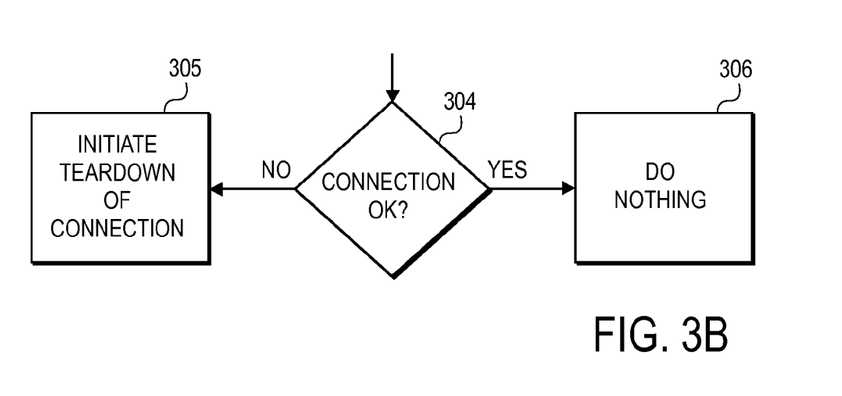
FIG. 3b shows a methodology to be executed by a node that sent a positive imposter response.

By inquiring, at a later time, into the actual status of each connection for whom a positive imposter response was sent, a network node that receives a sudden flood of status request messages is able to actually work through these request messages at a slower overall rate than what is necessary to ensure that the connections to which they pertain are not torn down by the nodes that initially sent the status request messages. As such, working connections are not inadvertently dropped; and, the flooded node is able to actually process the messages at a rate that is consistent within its own capacity limits. FIG. 3b shows an embodiment of a methodology that may be executed by the flooded node in response to the later inquiry that is initiated by the imposter status request response function 202.

According to the methodology of FIG. 3b, if a connection for whom a positive imposter response was sent is properly working 304; then, nothing is done 306 (i.e., no signaling messages are sent). In this case, the previously sent positive imposter response provided correct information to the node that originated the status request message (i.e., that the referenced connection is working). As such, no corrective action or update is needed. If the connection is not working properly, the flooded node initiates a teardown of the connection 305 (if a teardown sequence for the connection has not already started). Here, the tearing down of a connection typically involves the sending of another type of signaling message to the node that originated the status request message (e.g., a signaling message that indicates the connection at issue is to be torn down or is being torn down).

As such, regardless of the outcome of the inquiry 304 into the true status of the connection—a formal response to the status request message (as would normally be provided via flow 210 from the status request engine 208) is not needed. Note that the flooded node may initiate a teardown of a non-working connection (e.g., including the sending of a signaling message that causes the node that sent the status request message to recognize that the connection is to be torn down) independently of and prior to the inquiry 304 that is initiated by the imposter status request response function 202. If so, the flooded node can effectively ignore the inquiry 304 that is initiated by the imposter status request response function 202. If not, the inquiry 304 that is initiated by the imposter status request response function 202 can be used by the flooded node to initiate the teardown of the connection; or, "mark" the connection for teardown at a later time.

Here, a few additional comments regarding the imposter status request function 202 are in order. Firstly, the amount of time that is expended before a later inquiry is made into the true status of a connection for whom an imposter response was sent may vary from embodiment to embodiment. Some embodiments may be designed so as to have a "fixed" time between: 1) the arrival of a status request message within the active offload state; and, 2) the time that the imposter status request function 202 initiates the inquiry 304 into the true status of the connection to which the received status request message referred. Other embodiments may have varied times between the pair of events described just above, on a request message by request message basis. For example, by being designed to recognize when the resources that check into the status of a connection are available, the imposter status request function 202 may initiate an inquiry only when such resources are available.

Moreover, the precise nature by which the later inquiry is made by the imposter status request function 202 may also vary from embodiment to embodiment. Here, it is important to recognize that the architecture of FIG. 2 is a functional architecture that is drawn to help the reader understand basic operational features. Thus, even though hardware implementations that strictly conform to the depiction of FIG. 2 are possible, it is altogether foreseeable that other implementations may be developed. For example, each of the "functions" 206, 201, 202 may be developed as software routines rather than hardware circuitry. Other implementations where any or each of the functions 206, 201, 202 are implemented in hardware (e.g., with logic circuitry) or a combination of hardware and software are also possible.

Note also that, for convenience, FIG. 2 draws the appropriately timed later inquiry flow $209b_1$ as being a component of the service request engine output $209b$ (in order to suggest that the hardware and/or software resources responsible for checking into the status of a connection (not shown in FIG. 2) may receive such a request from either entity 202, 208). Although possible, no strict "connection" between the operation of the service request engine 208 and the operation of the imposter status request function 202 is required. Note also that the reserve queue 203 indicates that status request messages may be flushed once the imposter status request function recognizes that a positive imposter response is to be sent for (and that a later inquiry is to be made into the status of) the connection to which the status request message referred. Here, the imposter status request function 202 may be designed so as to have some form of access to a data keeping resource that allows a record of those connections for which a later inquiry 304 is needed to be kept track of.

A few additional comments are also in order with respect to the nature of the trigger events that cause the active offload state to be entered. As already discussed, one such event is a "switchover" to a new signaling control function card. The ability to detect this event is suggested in FIG. 2 by input 205 to the event detection and state control function 201. Another suitable event is the recognition that the primary queue 207 is beginning to "fill up". In order to implement such a trigger condition, a queue threshold 220 may be pre-configured such that, when the state of the primary queue 207 reaches the threshold 220, the event detection and state control function 201 recognizes that a trigger state has been reached; and, as a consequence, the active offload state is automatically entered. Here, any number of events could cause the threshold to be reached (e.g., a larger node, as part of its internal maintenance routine, suddenly sends a status request connection for each of its connections; the service request engine 208 becomes less effective because processing resources have been devoted elsewhere, etc.).

Note also that, referring to FIG. 3a, entry into the active offload state is maintained until the flood of status request messages is deemed to have been sufficiently abated (i.e., the answer to inquiry 301 is "yes" until the flood appears to be over). In one embodiment, once the active offload state is entered, the flood is deemed to be abated after a specific amount of time has passed. That is, the active offload state is maintained for a set amount of time after the active offload state is entered; then, upon expiration of this time period, the normal state is entered. This effectively corresponds to answering "yes" to inquiry 301 until expiration of the time period; and then, upon expiration of the time period, answering "no" to inquiry 301 until the next trigger event arises. For events that are triggered by the reaching of a threshold within the primary queue 207, rather than using a specific time period, the normal state may be returned to once the state of the primary queue falls to a second, lower threshold level.

Figure 4:
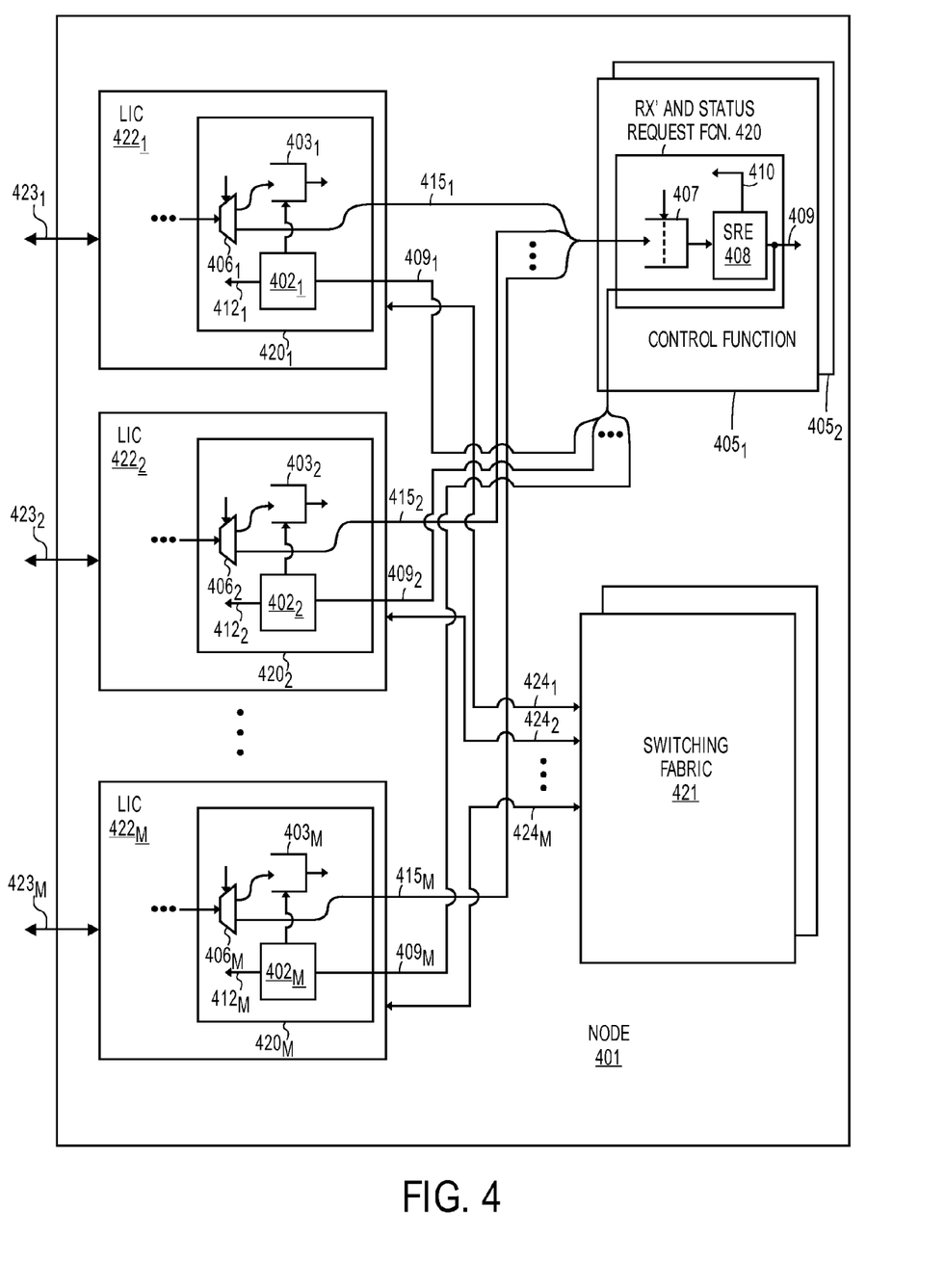
FIG. 4 shows a networking system architecture that distributes a portion of the functional architecture of FIG. 2 to its LIC cards.

FIG. 4 shows an embodiment of a networking system 401 that can be used as a node within a network. The networking system of FIG. 4 includes a plurality of line interface cards $422_1$ through $422_M$ (LICs). Each LIC typically interfaces to at least one ingress networking line (e.g., a copper or fiber optic line upon which networking data units are received) and to at least one egress networking line (e.g., a copper or fiber optic line upon which networking data units are transmitted). For simplicity, the ingress and egress lines for each of LICs $422_1$ through $422_M$ are drawn as bi-directional merged networking lines $423_1$ through $423_M$, respectively.

The networking system also includes a switching fabric 421 that switches networking data units (e.g., packets, cells, frames, etc.) toward their appropriate ingress and egress networking lines.

That is, for example, a networking data unit that is received at LIC $422_1$ and that is associated with a connection that "connects" to a node that communicates to node 401 through LIC $422_M$ will be directed: 1) from LIC $422_1$ to switching fabric 421 over link $424_1$; 2) through switching fabric 421 from link $424_1$ to link $424_M$; and, 3) from link $424_M$ to LIC $422_M$ for transmission over the appropriate egress networking line. As such, links $422_1$ through $422_M$ are used to transport ingress/egress traffic to/from the switching fabric 421 and their corresponding LICs $422_1$ through $422_M$. In alternate embodiments links $424_1$ through $424_M$ may be replaced with a bus. Working networks not only carry customer data (in the form of networking data units that are switched by the switching fabric 421) but also carry signaling messages (as described in the background). Here, signaling control function cards $405_1$, $405_2$ implement the signaling function of the node 401 (noting that one of cards $405_1$, $405_2$ may be the primary card while the other is the secondary card).

According to the approach of FIG. 4, a Received Status Request Function 420 (which corresponds to the Received Status Request Function 206 of FIG. 2) is implemented on each of cards $405_1$, $405_2$. By contrast, the imposter status request function $402_1$ is distributed across each of LICs $422_1$ through $422_M$. As a consequence, in the normal state, service request messages are sent from the particular LICs that they are received at and forwarded to the primary signaling control card; but, in the active offload state, service request messages are effectively intercepted by the LICs that they are received at. As a consequence, while in the active offload state, service request messages are not sent to the signaling control card. This, in turn, corresponds to the protection provided to the Received Status Request Function during the active offload state (i.e., the Received Status Request Function is not inundated with status request messages).

Moreover, the LICs $422_1$ through $422_M$ themselves are responsible for generating the positive imposter responses. The event detection and state control function has not been drawn in FIG. 4 because, in an embodiment where the LICs $422_1$ through $422_M$ take over a portion of the active offload state function (as described just above), the event detection and state control function could be distributed across the LICs $422_1$ through $422_M$; or, could be centralized onto the signaling control cards. Note that service request messages pass over links $415_1$ through $415_M$ to the signaling control card during the normal state; and, delayed inquiries into the status of the connection that has already had a positive imposter response sent on its behalf are initiated over links $409_1$ through $409_M$. Each of links $409_1$ through $409_M$ and/or $415_1$ through $415_M$ may be implemented as either point-to-point or a bus.

These same links may be kept separated per LIC (e.g., link $409_1$ and $415_1$ for LIC $422_1$) or may be merged together as a common transport medium. It is important to recognize that alternative networking systems may also be constructed where positive imposter responses are generated from the signaling control cards (rather than the LICs as discussed above with respect to FIG. 4). Such approaches correspond to a centralized approaches rather than a distributed approach.

Also since any or all of the relevant functions discussed above may be implemented wholly or partially in software, embodiments of these functions may be embodied wholly or partially within a machine readable medium. Note that, particularly in the case of distributed approaches, more than one machine readable medium may be used.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer implemented method to be executed by a computer in a networking system, said computer performing said method comprising:

sending a positive imposter response as a consequence of a status request message having been received, said status request message referring to a network connection, said status request message having been sent to said networking system to ask said networking system to inquire into the status of said network connection, said positive imposter response indicating that said network connection is working properly without inquiring into a true status of said network connection.

2. The method of claim 1 further comprising placing said networking system in a state that causes said sending, said networking system being placed into said state because a switch has been made to a new primary signaling control card within said networking system.

3. The method of claim 2 further comprising keeping said networking system in said state for a fixed period of time after said switch, and, sending a positive imposter response for each status request message that is received while said networking system is within said state.

4. The method of claim 3 further comprising placing said networking system into a second state as a consequence of said fixed period of time having expired, and, not sending a positive imposter response for any status request message that is received while said networking system is within said second state.

5. The method of claim 4 further comprising queuing into said queue all status request messages that are received while said networking system is within said second state, and, using a service request engine to service said queue.

6. The method of claim 1 further comprising placing said networking system in a state that causes said sending, said networking system being placed into said state because a queue that provides status request messages to a service request engine has reached a specified threshold level.

7. The method of claim 6 further comprising keeping said system in said state until said queue reaches a level that is lower than said threshold level, and, sending a positive imposter response for each status request message that is received while said networking system is within said state.

8. The method of claim 7 further comprising placing said networking system into a second state as a consequence of said queue reaching said lower level, and, not sending a positive imposter response for any status request message that is received while said networking system is within said second state.

9. The method of claim 8 further comprising queuing into said queue all status request messages that are received while said networking system is within said second state, and, using said service request engine to service said queue.

10. The method of claim 1 further comprising inquiring into the status of said network connection after said positive imposter response has been sent.

11. The method of claim 10 further comprising not sending another response to said status request message if said connection is properly working.

12. The method of claim 10 further comprising initiating a tear down of said connection if said connection is not properly working.

13. The method of claim 1 further comprising recognizing, on a line interface card (LIC), that said request message has arrived and authorizing said sending on said LIC.

14. A computer readable storage medium having stored thereon a plurality of instructions, said plurality of instructions when executed by a computer within a networking system, cause said computer to perform a method, said method comprising:

sending a positive imposter response as a consequence of a status request message having been received, said status request message referring to a network connection, said status request message having been sent to said networking system to ask said networking system to inquire into the status of said network connection, said positive imposter response indicating that said network connection is working properly without inquiring into a true status of said network connection.

15. The computer readable storage medium of claim 14 wherein said method further comprises:

placing said networking system in a state that causes said sending, said networking system being placed into said state because a switch has been made to a new primary signaling control card within said networking system.

16. The computer readable storage medium of claim 15 wherein said method further comprises:

keeping said networking system in said state for a fixed period of time after said switch, and, sending a positive imposter response for each status request message that is received while said networking system is within said state.

17. The computer readable storage medium of claim 16 wherein said method further comprises: placing said networking system into a second state as a consequence of said fixed period of time having expired, and, not sending a positive imposter response for any status request message that is received while said networking system is within said second state.

18. The computer readable storage medium of claim 17 wherein said method further comprises queuing into said queue all status request messages that are received while said networking system is within said second state, and, using a service request engine to service said queue.

19. The computer readable storage medium of claim 14 wherein said method further comprises: placing said networking system in a state that causes said sending, said networking system being placed into said state because a queue that provides status request messages to a service request engine has reached a specified threshold level.

20. The computer readable storage medium of claim 19 wherein said method further comprises keeping said networking system in said state until said queue reaches a level that is lower than said threshold level, and, sending a positive imposter response for each status request message that is received while said networking system is within said state.

21. The computer readable storage medium of claim 20 wherein said method further comprises placing said networking system into a second state as a consequence of said queue reaching said lower level, and, not sending a positive imposter response for any status request message that is received while said networking system is within said second state.

22. The computer readable storage medium of claim 21 wherein said method further comprises queuing into said queue all status request messages that are received while said networking system is within said second state, and, using said service request engine to service said queue.

23. The computer readable storage medium of claim 14 wherein said method further comprises inquiring into the status of said network connection after said positive imposter response has been sent.

24. The computer readable storage medium of claim 23 wherein said method further comprises not sending another response to said status request message if said connection is properly working.

25. The computer readable storage medium of claim 23 wherein said method further comprises initiating a tear down of said connection if said connection is not properly working.

26. The computer readable storage medium of claim 25 wherein said method further comprises recognizing, on a line interface card (LIC), that said request message has arrived and authorizing said sending on said LIC.

27. A networking system, comprising:
means for sending a positive imposter response as a consequence of a status request message having been received, said status request message referring to a network connection, said status request message having been sent to said networking system to ask said networking system to inquire into the status of said network connection, said positive imposter response indicating that said network connection is working properly without inquiring into a true status of said network connection; and,
means for placing said networking in a state that causes said sending.

28. The networking system of claim 27 wherein said means for placing said networking system in a state further comprises means for detecting that a switch has been made to a new primary signaling control card within said networking system.

29. The networking system of claim 28 further comprising means for keeping said networking system in said state for a fixed period of time after said switch, and, said means for sending a positive imposter response further comprises means for sending a positive imposter response for each status request message that is received while said networking system is within said state.

30. The networking system of claim 29 further comprising means for placing said networking system into a second state as a consequence of said fixed period of time having expired, and wherein said means for sending a positive imposter response does not send a positive imposter response for any status request message that is received while said networking system is within said second state.

31. The networking system of claim 30 further comprising means for queuing into said queue all status request messages that are received while said networking system is within said second state, and, a service request engine that services said queue.

32. The networking system of claim 27 wherein said means for placing said networking system in a state further comprises means for detecting that a queue that provides status request messages to a service request engine has reached a specified threshold level.

33. The networking system of claim 32 further comprising means for keeping said networking system in said state until said queue reaches a level that is lower than said threshold level, and wherein, said means for sending a positive imposter response further comprises means for sending a positive imposter response for each status request message that is received while said networking system is within said state.

34. The networking system of claim 33 further comprising means for placing said networking system into a second state as a consequence of said queue reaching said lower level, and wherein, said means for sending a positive imposter response does not send a positive imposter response for any status request message that is received while said networking system is within said second state.

35. The networking system of claim 34 further comprising means for queuing into said queue all status request messages that are received while said networking system is within said second state into.

36. The networking system of claim 27 further comprising means for inquiring into the status of said network connection after said positive imposter response has been sent.

37. The networking system of claim 36 further comprising means for initiating a tear down of said connection if said connection is not properly working.

38. The networking system of claim 27 further comprising means for recognizing, on a line interface card (LIC), that said request message has arrived and means for authorizing said sending on said LIC.

39. An apparatus, comprising:
a networking system that sends a positive imposter response as a consequence of a status request message having been received, said status request message referring to a network connection, said status request message having been sent to said networking system to ask said networking system to inquire into the status of said network connection, said positive imposter response indicating that said network connection is working properly without inquiring into a true status of said network connection.

40. The apparatus of claim 39 wherein said networking system can be placed into a state that causes said sending, said networking system being placed into said state because a switch has been made to a new signaling primary control card within said networking system.

41. The apparatus of claim 40 wherein said networking system remains in said state for a fixed period of time after said switch, and, sends a positive imposter response for each status request message that is received while said networking system is within said state.

42. The apparatus of claim 41 wherein said networking system can be placed into a second state as a consequence of said fixed period of time having expired, and wherein, said networking system does not send a positive imposter response for any status request message that is received while said networking system is within said second state.

43. The apparatus of claim 42 further comprising a queue that queues all status request messages that are received while said networking system is within said second state, and, a service request engine to service said queue.

44. The apparatus of claim 39 wherein said networking system can be placed into a state that causes said sending, said networking system being placed into said state because a queue that provides status request messages to a service request engine has reached a specified threshold level.

45. The apparatus of claim 44 wherein said networking system remains in said state until said queue reaches a level that is lower than said threshold level, and wherein, said networking system sends a positive imposter response for each status request message that is received while said networking system is within said state.

46. The apparatus of claim 45 wherein said networking system can be placed into a second state as a consequence of said queue reaching said lower level, and wherein, said networking system does not send a positive imposter response for any status request message that is received while said networking system is within said second state.

47. The apparatus of claim 45 wherein said networking system inquires into the status of said network connection after said positive imposter response has been sent.

48. The apparatus of claim 47 wherein said networking system does not send another response to said status request message if said connection is properly working.

49. The apparatus of claim 47 wherein said networking system initiates a tear down of said connection if said connection is not properly working.

50. The apparatus of claim 39 wherein said networking system further comprises a line interface card (LIC) that recognizes that said request message has arrived and that authorizes said sending.

51. A networking system, comprising:
a) an event detection and state control unit;
b) a received status request unit, said received status request unit further comprising a primary queue and a service request engine unit;
c) a multiplexer that multiplexes received status requests into:
  a) said primary queue if said event detection and state control unit determines that said networking system is to be within a normal operating mode;
  b) a reserve queue if said event detection and state control unit determines that said networking system may receive a flood of request messages or has received a flood of request messages;
  c) a positive imposter status request response unit coupled to said reserve queue, said positive imposter status request response unit to send a positive imposter status request response for each status request entered into said reserve queue.

* * * * *